US012579632B2

(12) United States Patent
Tang et al.

(10) Patent No.: US 12,579,632 B2
(45) Date of Patent: Mar. 17, 2026

(54) ANOMALY DETECTION FOR PRODUCT QUALITY CONTROL

(71) Applicant: Accenture Global Solutions Limited, Dublin (IE)

(72) Inventors: Binghao Tang, Shenzhen (CN); Keyu Qi, Dongguan (CN); David Nguyen, Newark, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 433 days.

(21) Appl. No.: 18/168,309

(22) Filed: Feb. 13, 2023

(65) Prior Publication Data

US 2024/0273702 A1      Aug. 15, 2024

(51) Int. Cl.
*G06T 5/50* (2006.01)
*G06T 5/77* (2024.01)
*G06T 7/00* (2017.01)
*G06V 10/25* (2022.01)
*G06V 10/74* (2022.01)

(52) U.S. Cl.
CPC .............. *G06T 7/0008* (2013.01); *G06T 5/50* (2013.01); *G06T 5/77* (2024.01); *G06V 10/25* (2022.01); *G06V 10/761* (2022.01); *G06T 2207/10024* (2013.01); *G06T 2207/20084* (2013.01); *G06T 2207/20224* (2013.01)

(58) Field of Classification Search
CPC ....... G06T 7/0008; G06T 7/0004; G06T 5/50; G06T 5/77; G06T 2207/10024; G06T 2207/20084; G06T 2207/20224; G06V 10/25; G06V 10/761; G06V 10/82
See application file for complete search history.

(56) References Cited

U.S. PATENT DOCUMENTS

| | | | |
|---|---|---|---|
| 2020/0027693 A1* | 1/2020 | Fang ........................ | H01L 22/12 |
| 2023/0133152 A1* | 5/2023 | Barnehama .......... | G06K 7/1413 |
| | | | 382/141 |
| 2024/0046617 A1* | 2/2024 | Adolf .................... | G06T 7/0004 |

(Continued)

OTHER PUBLICATIONS

Tang et al., "Improved Anomaly Detection Based on Image Reconstruction and Global Template Features for Industrial Products," Presented at Proceedings of the International Conference on Frontiers of Electrical Power & Energy Systems 2021 (EPES 2021), Guangdong, China, Nov. 1-14, 2021; Journal of Physics: Conference Series, 2022, 2166:012062, 8 pages.

(Continued)

*Primary Examiner* — Ming Y Hon
*Assistant Examiner* — Amanda H Pearson
(74) *Attorney, Agent, or Firm* — Mannava & Kang, P.C.

(57) ABSTRACT

Implementations include receiving an image of an object; obtaining a reconstructed image by processing the image through a ML model; obtaining a gradient difference image by comparing the image to the reconstructed image; generating an output image at least partially by suppressing non-significant regions representing non-significant anomalies from the gradient difference image using a non-significant suppression (NSS) map; determining whether an anomaly is depicted in the output image; and in response to determining that an anomaly is depicted in the output image, sending an alert indicating that the object is defective.

14 Claims, 4 Drawing Sheets

(56)  References Cited

U.S. PATENT DOCUMENTS

| 2024/0160194 A1* | 5/2024 | Bakhshmand | ....... G06N 3/0455 |
| 2024/0281961 A1* | 8/2024 | Ohnishi | ................ G06T 7/0004 |

OTHER PUBLICATIONS

Wang et al., "Image Anomaly Detection Using Normal Data Only by Latent Space Resampling," Applied Sciences, Dec. 3, 2020, 10(23):8660, 19 pages.
Zavrtanik et al., "Reconstruction by inpainting for visual anomaly detection," Pattern Recognition, Apr. 2021, 112:107706, 9 pages.

* cited by examiner

ANOMALY DETECTION FOR PRODUCT QUALITY CONTROL

BACKGROUND

Anomaly detection can be useful in a wide range of applications, such as product quality control. For example, products can be evaluated for anomalies before being forwarded down a supply chain and/or provided to consumers. Automated anomaly detection systems have been developed in industry, in which machines make determinations of presence or absence of anomalies by processing object images acquired through digital cameras or sensors. Anomaly detection makes it possible to prevent deficient products from moving along supply chains, improve product quality control, increase economic efficiency, and optimize manufacturing process, among other uses.

SUMMARY

Implementations of the present disclosure are generally directed to anomaly detection of objects based on images. More particularly, implementations of the present disclosure are directed to an anomaly detection system that processes images of objects using machine learning (ML) models to detect anomalies. In some examples, the anomaly detection system of the present disclosure can be used for quality control of products.

In some implementations, actions include receiving an image of an object; obtaining a reconstructed image by processing the image through a ML model; obtaining a gradient difference image by comparing the image to the reconstructed image; generating an output image at least partially by suppressing non-significant regions representing non-significant anomalies from the gradient difference image using a non-significant suppression (NSS) map; determining whether an anomaly is depicted in the output image; and in response to determining that an anomaly is depicted in the output image, sending an alert indicating that the object is defective. Other implementations of this aspect include corresponding systems, apparatus, and computer programs, configured to perform the actions of the methods, encoded on computer storage devices.

These and other implementations can each optionally include one or more of the following features. In some implementations, the actions include generating the NSS map by: obtaining a set of reconstructed images by processing a set of images using the ML model; comparing each image in the set of images with a respective reconstructed image in the set of reconstructed images to obtain a difference map including a set of difference components; and generating the NSS map based on selecting difference components that satisfy a difference threshold. In some implementations, the difference threshold is determined based on a set of defect images, each defect image representing a sample of the object including one or more defects.

In some implementations, the NSS map is initially generated using a set of images, each image in the set of images being absent any defect anomaly. In some implementations, the image depicts a side of the object and the ML model and the NSS map are each specific to the side.

In some implementations, the actions include extracting a region of interest (ROI) for the image included in the one or more images; and adjusting the image based on the ROI prior to obtaining the reconstructed image. In some implementations, the ROI is extracted based on a predefined range in a hue saturation value (HSV) color-space of the image.

In some implementations, the output image is further generated by removing representation of debris from the output image, removing the representation of debris including removing any connected component having a size that is less than a size threshold. In some implementations, the ML model includes a convolutional neural network (CNN)-based auto-encoder.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
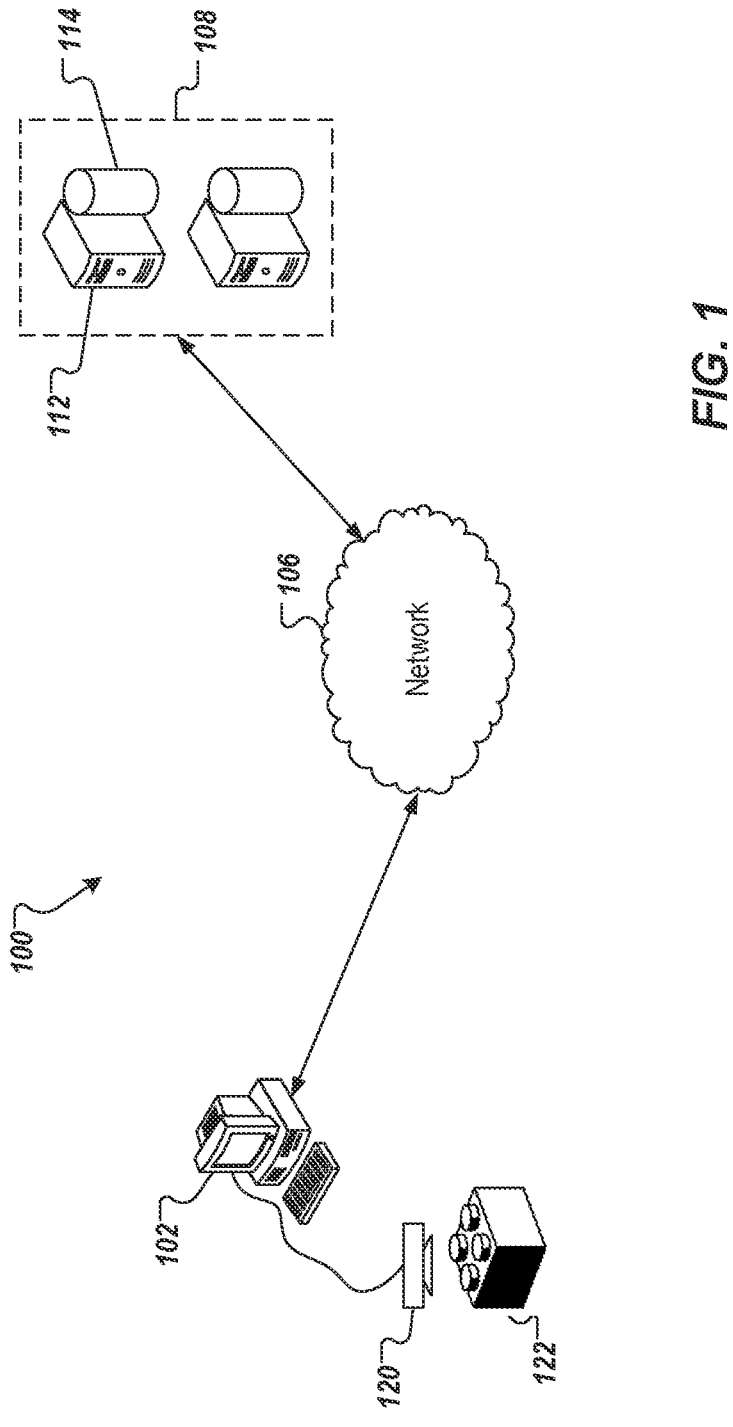
FIG. 1 depicts an example system that can execute implementations of the present disclosure.

Implementations of the present disclosure are generally directed to anomaly detection of objects based on images. More particularly, implementations of the present disclosure are directed to an anomaly detection system that processes images of objects using machine learning (ML) models to detect anomalies. In some examples, the anomaly detection system of the present disclosure can be used for quality control of products.

In some implementations, actions include receiving an image of an object; obtaining a reconstructed image by processing the image through a ML model; obtaining a gradient difference image by comparing the image to the reconstructed image; generating an output image at least partially by suppressing non-significant regions representing non-significant anomalies from the gradient difference image using a non-significant suppression (NSS) map; determining whether an anomaly is depicted in the output image; and in response to determining that an anomaly is depicted in the output image, sending an alert indicating that the object is defective.

To provide further context, and as introduced above, anomaly detection can be useful in a wide range of applications, such as product quality control. Automated anomaly detection systems have been developed in industry, in which machines make determinations of presence or absence of anomalies by processing object images acquired through digital cameras or sensors. In anomaly detection, an example system includes using a ML model to detect presence or absence of anomalies. However, traditional automated anomaly detection systems have technical deficiencies. For example, the ML model may not be able to differentiate non-significant anomalies from real defects. For example, a detected anomaly may be due to a certain part of the object being reflective, and, as a result an image of the object is determined to depict an anomaly, when an anomaly is not actually present. That is, an anomaly is detected, but is not a real defect in the object. Because the ML model can have difficulty recognizing such non-significant anomalies that do not count as defects, the prediction results from the ML model may include a relatively high false positive rate. This results in consumption of resources to address objects that are actually non-defective.

In view of the foregoing, and as introduced above, implementations of the present disclosure are directed to an anomaly detection system that can reduce false positives by suppressing the non-significant anomalies and removing other debris/noises. In some implementations, one or more images of an object are received. A region of interest (ROI) can be extracted from an image. A reconstructed image of the ROI can be obtained by restoring the ROI of each image using a ML model. Presence or absence of an anomaly is determined from the image by comparing the restored image with the received image. For example, areas within the image can indicate presence of an anomaly. However, it is unclear whether the anomaly is a true positive (true defect) or a false positive (noise and/or other non-significant anomalies that do not count as defects). To distinguish whether a detected anomaly is a true positive or a false positive, implementations of the present disclosure apply a non-significant suppression (NSS) map. In some examples, the NSS map is generated using image samples that are absent anomalies (true defects). In some implementations, debris that may be present on the object can be removed by removing connected components whose sizes are less than a size threshold. An output image is provided and is used to determine the presence or absence of anomalies in the object. As described in further detail herein, the anomaly detection system of the present disclosure can detect real defects of the object with higher accuracy and lower false positive rate than traditional anomaly detection systems.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented services that users can interact with using computing devices. For example, the server system 112 can host systems for training ML models of an anomaly detection system in accordance with implementations of the present disclosure.

In the example of FIG. 1, a camera 120 and an object 122 are depicted. The camera 120 can by any appropriate type of camera (e.g., video camera) that generates images representing objects, such as the object 122. In the context of the present disclosure, the camera 120 can generate images as digital data representing the object 122. The camera 120 can capture images of every side of the object 122, such as front, back, left, right, top, and bottom sides of the object 122. In some example, multiple cameras 120 installed in different angles can be provided to capture images of every side of the object 122. In some examples, the object 122 can be rotated, so that the camera 120 can capture images of every side of the object 122. In accordance with implementations, images can be processed by an anomaly detection system to determine whether the object 122, as represented within the images, includes any anomal-y/ies. In some examples, the anomaly detection system is executed on the computing device 102. In some examples, the anomaly detection system is executed in the back-end system 108.

Figures 2, 3A, 3B:
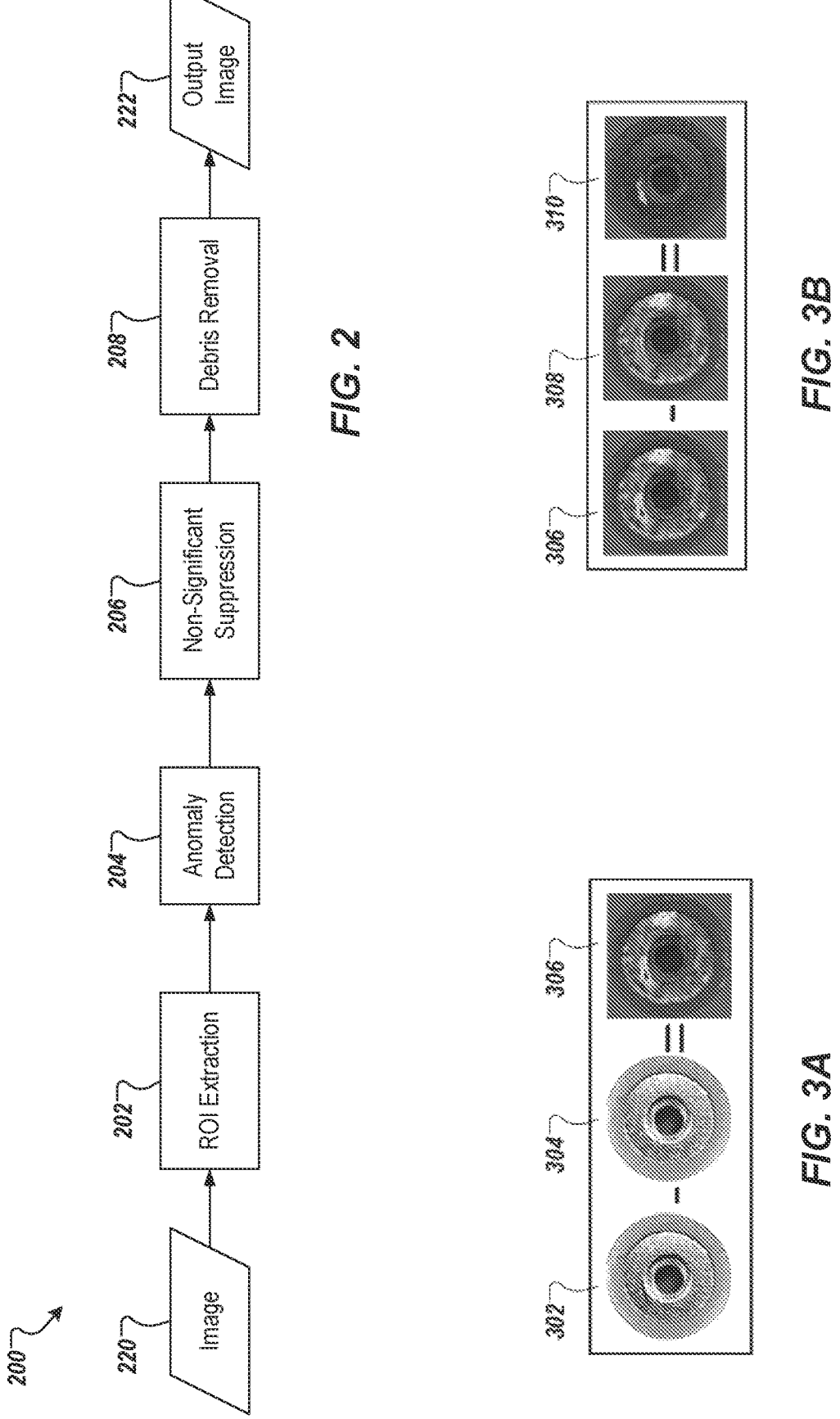
FIG. 2 depicts an anomaly detection system in accordance with implementations of the present disclosure.
FIGS. 3A and 3B depict example images for anomaly detection using non-significant suppression (NSS) in accordance with implementations of the present disclosure.

FIG. 2 depicts an anomaly detection system 200 in accordance with implementations of the present disclosure. In the example of FIG. 2, the anomaly detection system 200 includes a ROI extraction module 202, an anomaly detection module 204, a NSS module 206, and a debris removal module 208. As described in further detail herein, the anomaly detection system 200 receives an input image 220 and processes the input image 220 to generate an output image 222. The output image 222 can represent one or more anomalies of an object depicted in the input image 220, if any.

In further detail, the anomaly detection system 200 can receive the input image 220 from one or more cameras. The input image 220 can include an image of an object from a respective side (e.g., top, bottom, left, right, front, back). In general, the input image 220 is a digital image represented as data, the data providing values for each of a plurality of pixels that the input image 220 is composed of. The input image 220 can be provided using any appropriate color-space. Example color-spaces can include, without limitation, red, green blue (RGB) and hue, saturation, value (HSV). In some examples, and with respect to RGB, each pixel includes respective values for a red channel, a green channel, a blue channel, and an alpha channel, where alpha represents an opaqueness of the respective pixel (e.g., referred to as the RGBa format). In some examples, the input image 220 is processed to convert the pixel values to another color-space. For example, the input image 220 can be processed to convert from RGB to HSV. In some examples, in HSV, the hue value represents a color of a respective pixel and is expressed as a number from 0 to 360 degrees (e.g., red falls between 0 and 60 degrees, yellow falls between 61 and 120 degrees, green falls between 121-180 degrees, cyan falls between 181-240 degrees, blue falls between 241-300 degrees, and magenta falls between 301-360 degrees). In some examples, the saturation value represents an amount of gray in the color of the respective pixel and can be provided in a range of 0 to 1, where 0 is gray and 1 is a primary color. In some examples, the value in HSV represents the brightness of the color of the respective pixel and can be provided in a range of 0 to 100 percent, where 0 is completely black and 100 is the brightest.

In some implementations, the input image 220 can be processed by the ROI extraction module 202 to determine a ROI. In some examples, the ROI represents a region within the input image 220 that the object is depicted within. In some examples, the ROI is determined based on a predefined range in the HSV color-space. For example, any pixel having a hue between 0 and 60, a saturation between 0.1 and 0.2, and a value between 0.3 and 0.4 is included in the ROI. In some examples, after determining the ROI, the input image 220 is adjusted (e.g., cropped) to largely depict the extracted ROI of the input image. For example, adjusting can eliminate entities (e.g., reflections, shadows) around the object that can negatively impact anomaly detection. The (adjusted) input image is processed by the anomaly detection module 204.

In some implementations, after determining the ROI based on the HSV of the input image, the image data (e.g., RGB value) of the adjusted input image can be normalized using mean and variance under ImageNet setting. The normalized (adjusted) input image can be processed by the anomaly detection module 204.

In some implementations, the anomaly detection module 204 can include a ML model that processes the input image 220 (e.g., the adjusted input image 220) to obtain a reconstructed image. In some examples, the ML model is provided as an auto-encoder (AE) that is trained to learn normal (non-defective) features of the object based on training data that includes images depicting non-defective (non-anomalous) examples of the object. In some examples, the AE can be a convolutional neural network (CNN)-based AE. In some examples, the AE can be a network that combines visual geometry group (VGG) network and U-net. For example, the U-net encoder is replaced with the VGG network, e.g., the combination of encoder of VGG and decoder of U-net. In image reconstruction, the ML model attempts to reconstruct features of the input image 220 towards non-anomalous features in the resulting reconstructed image. For example, anomalous features are attempted to be reconstructed as non-anomalous features of the object to obtain the reconstructed image.

In general, the ML model is iteratively trained, where, during an iteration, one or more parameters (e.g., weights) of the ML model are adjusted, and an output is generated based on the training data. In some example, the ML model (e.g., AE) uses ImageNet pertained weights to accelerate the model training process. In the context of the present disclosure, the training data includes images depicting non-defective (non-anomalous) examples of the object. For each iteration, a loss value is determined based on a loss function. The loss value represents a degree of accuracy of the output of the ML model. The loss value can be described as a representation of a degree of difference between the image input to the ML model and the reconstructed image output by the ML model (e.g., reconstruction loss). In some examples, if the loss value does not meet an expected value (e.g., is not equal to zero), parameters of the ML model are adjusted in another iteration of training. In some instances, this process is repeated until the loss value meets the expected value.

In some implementations, a ML model is provided for each side of the object. For example, a set of images can be provided for the object, each image capturing a respective side of the object (e.g., top, bottom, left, right, front, back). Each image is processed through a respective ML module that is trained for the respective side of the object.

In some implementations, a gradient difference image is generated based on the reconstructed image and the input image 220 (e.g., adjusted input image 220). For example, the reconstructed image is compared to the input image 220 to calculate a difference (e.g., gradient difference) there between. This is described in further detail herein with reference to FIG. 3A.

The ML model is trained to be sensitive enough to capture any potential anomalies of the object represent in the input image 220. As a result, the gradient difference image can include a mix of true positives (true defects) and false positives (noises and other non-significant anomalies that do not count as defects). To remove any false positives, the gradient difference image is processed by the NSS module 206 to suppress any non-significant anomalies. In some examples, a non-significant anomaly is an anomaly that is represented in the reconstructed image that does not qualify as an actual anomaly. Examples can include, but are not limited to, reflections (e.g., from a camera flash) and dirty spots. The NSS module 206 can include a NSS map that provides representations of non-significant anomalies (that do not count as defects) in images (e.g., images in the training data used to train the ML model) depicting non-defective (non-anomalous) examples of the object. The NSS module 206 can suppress non-significant regions that include such non-significant anomalies by subtracting the NSS map from the gradient difference image to provide a NSS output image. The NSS output image is absent non-significant anomalies. This is described in further detail herein with reference to FIG. 3B.

In some implementations, a NSS map is provided for each side of the object. For example, a set of gradient difference images can be provided for the object, each gradient difference image corresponding to a respective side of the object (e.g., top, bottom, left, right, front, back). Each gradient difference image is processed using a respective NSS map that represents non-significant regions of a respective side.

In some implementations, the debris removal module 208 can further remove the debris (such as noises) that do not count as defects to reduce false positives. In some examples, the debris can be removed from the NSS output image based on a size of connected components depicted in the NSS output image. For example, contours of the connected components in the NSS output image can be analyzed to calculate their sizes. If the size of a connected component is less than a size threshold, the connected component is removed from the NSS output image as debris. In other words, removing the debris includes removing connected components whose sizes are less than a size threshold. The output image 222 is provided from the debris removal module 208.

In accordance with implementations of the present disclosure, the anomaly detection system 200 can process the output image 222 to determine whether any anomal-y/-ies that represent defects in the object (e.g., the anomalies are actual defects in the object). The anomalies representing actual defects can be determined based on that one or more pixel values of the output image 222 (with NSS and debris removed) satisfy (e.g., beyond) a threshold value. The anomaly detection system 200 can selectively send an alert based on the detection result. The alert can indicate that the object includes at least one defect. In some examples, the anomaly detection system 200 can display the alert in a user interface. The user interface can include various output interfaces, such as a speaker or a screen. In some examples, the alert can include an image of the object that highlights the detected defect(s).

FIGS. 3A and 3B depict example images for anomaly detection using NSS in accordance with implementations of the present disclosure. The example of FIG. 3A represents a difference between an input image 302 and a reconstructed image 304 to provide a gradient difference image 306. The example of FIG. 3B includes a difference between the gradient difference image 306 and a NSS map 308 to provide an output image 310.

In further detail, as shown in FIG. 3A, the input image 302 is the extracted ROI in the input image 220. The reconstructed image 304 is the reconstructed image of ROI. The gradient difference image 306 can be calculated by subtracting the reconstructed image 304 from the input image 302. As discussed above, the gradient difference image 306 can include a mix of true positives (true defects) and false positives (noises and other non-significant anomalies that do not count as defects).

In some implementations, the input image 302 and the reconstructed image 304 can be iteratively downscaled by half on each dimension to obtain image pyramids that contains a set of images with lower resolution. For example, the downscaled images can be at different scales, such as an original scale, a half scale (original scale/2), and a quarter scale (original scale/4). As a result, a set of images (under different scales) for the input image 302 can be obtained. Similarly, a set of images (under different scales) for the reconstructed image 304 can be obtained. At each scale, the horizontal and vertical gradient values of the two sets of images can be calculated. In some examples, the gradient values can be calculated using image processing filter methods, such as Prewitt filters. Based on the horizontal and vertical gradient values, the degree of difference between the input image 302 and the reconstructed image 304 under each scale can be obtained. The degree of difference at different scales can be combined to obtain a weighted combination (such as a weighted average). The weighted combination can be the gradient difference image 306.

As shown in FIG. 3B, the non-significant anomalies are removed from the gradient difference image 306 to reduce false positives. The non-significant anomalies are included in the NSS map 308. By subtracting the NSS map 308 (including the non-significant anomalies) from the gradient difference image 306, a NSS output image 310 is obtained. The NSS output image 310 is an image that is absent non-significant anomalies. As a result, the false positives caused by non-significant anomalies can be removed from the gradient difference image 306. The NSS output image 310 can be further processed using the debris removal module 208 to remove debris, as discussed above.

Figures 4A, 4B:
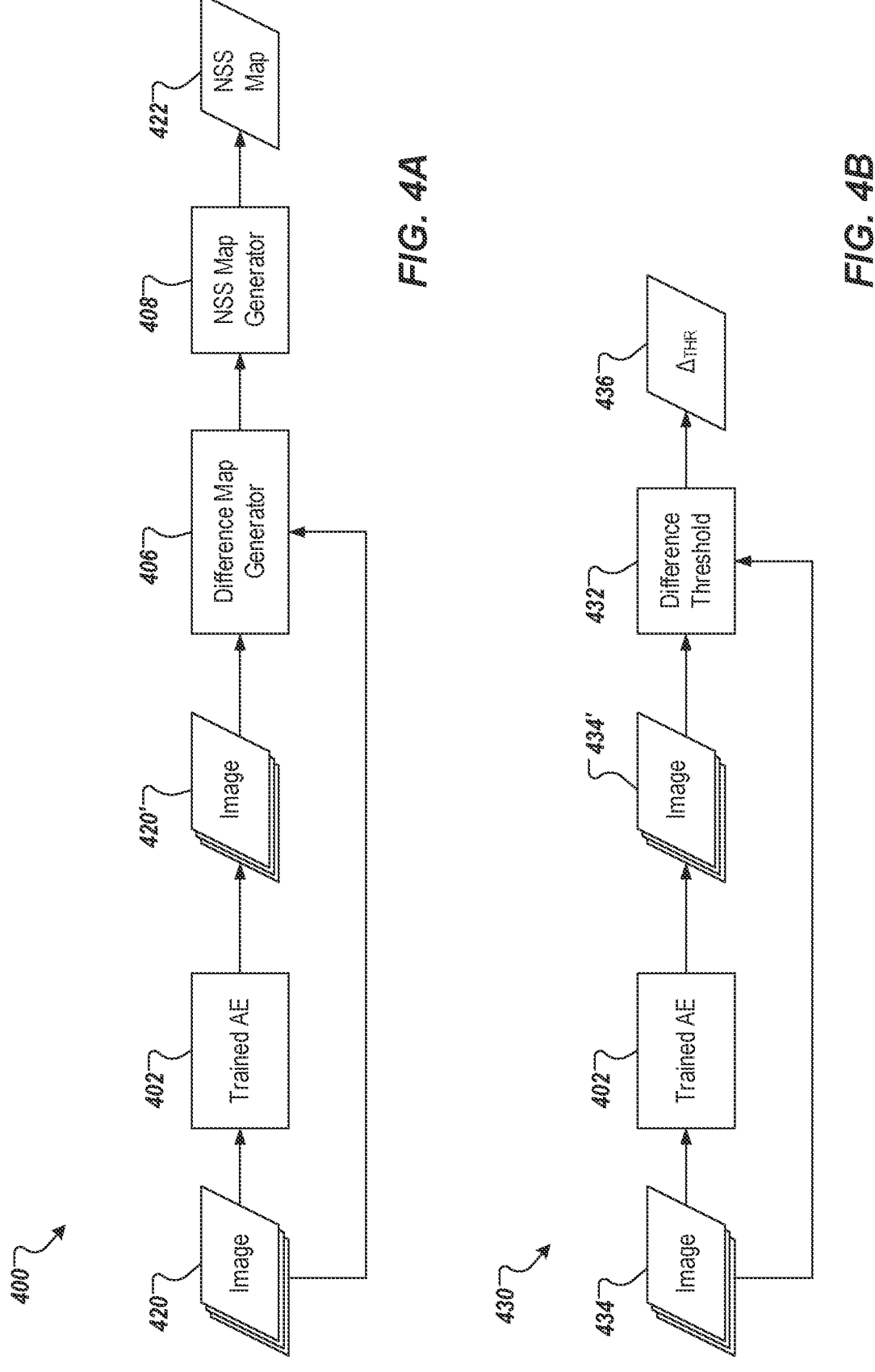
FIG. 4A depicts a NSS map generation system in accordance with implementations of the present disclosure.
FIG. 4B depicts a threshold determination system in accordance with implementations of the present disclosure.

FIG. 4A depicts a NSS map generation system 400 in accordance with implementations of the present disclosure. In the example of FIG. 4A, the NSS map generation system 400 includes a trained AE module 402, a difference map generator module 406, and a NSS map generator module 408. As described in further detail herein, the NSS map generation system 400 receives a set of images 420 and processes the set of images 420 to generate a NSS map 422. In some examples, the set of images 420 includes images of samples of the object that are absent any defect anomalies (non-defective samples). However, the set of images 420 can include non-significant anomalies that do not count as defects. The NSS map generation system 400 can generate the NSS map 422 to account for such non-significant anomalies represented in the set of images 420. In some examples, the set of images 420 are used as training data to train the ML model of the anomaly detection module 204 of FIG. 2.

The set of images 420 are processed by the trained AE module 402 that restores each image in the set of images 420 to obtain a respective reconstructed image in a set of reconstructed images 420'. The difference map generator module 406 can compare each image in the set of images 420 and its respective reconstructed image in the set of reconstructed images 420' to determine a difference map for each image. In some examples, the difference map generator module 406 can average the difference maps of the set of images to obtain the difference map for the object. The difference map can include a set of difference components at a pixel level.

The NSS map generator module 408 can generate the NSS map 422 that includes the non-significant anomalies (that do not count as defects) based on selecting difference components that satisfy a difference threshold. For examples, the NSS map generator module 408 can determine whether the difference components included in the difference map satisfies the difference threshold. The difference threshold can be a predetermined value, such as a value in the range of [0, 1]. For instance, a difference threshold of 0.3 indicates that there is a 30% difference in the pixel level. If a difference component satisfies (at or larger than) the difference threshold, the difference component is included in the NSS map 422, otherwise, the difference component is not included in the NSS map 422. For example, for each pixel on the difference map, if its value is larger than the difference threshold, the pixel is included in the NSS map, otherwise, the pixel is set to zero. As a result, the NSS map 422 can include the differences representing anomalies in the image samples of the non-defective object. Such anomalies are thus non-significant anomalies that do not count as defects.

In some implementations, the difference threshold used by the NSS map generator module 408 can be initially a human-selected value and then updated as objects are identified as defective using the anomaly detection system 200 of FIG. 2. For example, and as described in further detail herein, the difference threshold can be updated based on images that are input to the anomaly detection system 200 and that are determined to depict defective objects.

FIG. 4B depicts a threshold determination system 430 in accordance with implementations of the present disclosure. In the example of FIG. 4B, the threshold determination system 430 includes the trained AE module 402 and a difference threshold module 432. As described in further detail herein, the threshold determination system 430 receives a set of images 434 and processes the set of images 434 to determine a difference threshold ($\Delta_{THR}$) 436. In some examples, the set of images 434 includes images of samples of the object that have one or more defect anomalies (defective samples).

The set of images 434 are processed by the trained AE 402 that reconstructs each image to provide a respective reconstructed image in a set of reconstructed images 434'. The difference threshold module 432 can compare each image in the set of images 434 to its respective reconstructed image in the set of reconstructed images 434' to determine a set of differences at the pixel level. The minimum difference among the set of differences can be determined as the difference threshold ($\Delta_{THR}$) 436. After obtaining the difference threshold 436, the NSS map generation system 400 of FIG. 4A can use the updated difference threshold 436 in the NSS map generator module 408 to update the NSS map 422. The updated NSS map 422 can be used by the NSS module 206 of FIG. 2 for anomaly detection as described herein.

Figure 5:
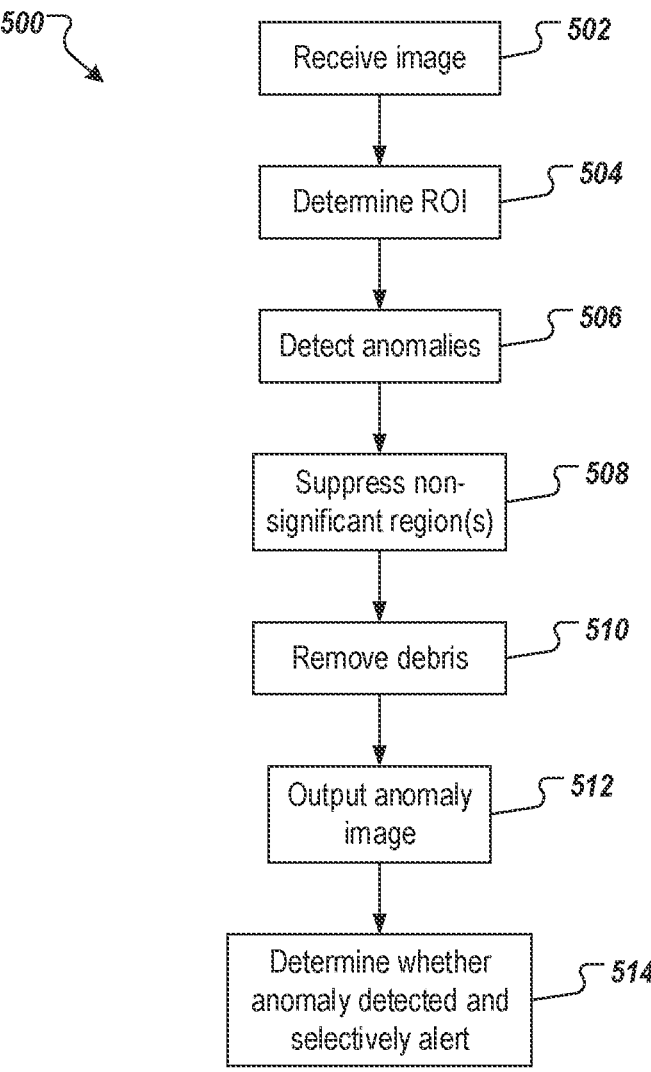
FIG. 5 depicts an example process that can be executed in accordance with implementations of the present disclosure.

FIG. 5 depicts an example process 500 that can be executed in implementations of the present disclosure. In some examples, the example process 500 is provided using one or more computer-executable programs executed by one or more computing devices. The example process 500 of FIG. 5 represents anomaly detection in accordance with implementations of the present disclosure.

An image is received (502). For example, and as described herein, the image can be an image of an object captured by a camera (e.g., the camera 120 of FIG. 1). For example, the image can depict a front, a back, a left, a right, a top, or a bottom side of the object. A ROI is determined (504). For example, and as described herein, the ROI can be extracted based on a predefined range in HSV space, the ROI represents a region within the image that the object is depicted within. In some examples, the image is adjusted (e.g., cropped), such that only the ROI is depicted within the image.

One or more anomalies are detected (506). For example, and as described herein, the image (e.g., adjusted image) can be processed using a ML model (e.g., AE) to obtain a reconstructed image. In image reconstruction, the ML model attempts to reconstruct features of the input image 220 towards non-anomalous features in the resulting reconstructed image. After obtaining the reconstructed image, the image and the reconstructed image are compared to calculate a difference (e.g., a gradient difference) there between. For example, a gradient difference image is obtained based on the comparison (e.g., subtracting the reconstructed image from the image). The gradient difference image can include any potential anomalies. Among the potential anomalies, there can be true positives (true defects) and false positives (noise and other non-significant anomalies that do not count as defects).

One or more non-significant regions are suppressed (508). For example, and as described herein, the gradient difference image can be further processed to remove potential false positives, such as non-significant regions that include non-significant anomalies that are not considered as defects. The non-significant anomaly regions can be represented in a NSS map. The one or more non-significant anomaly regions can be suppressed by subtracting the NSS map from the gradient difference image. As a result, a NSS output image is obtained.

Debris is removed (510). For example, and as described herein, any debris on the object and depicted in the NSS output image can be removed to reduce false positives. In some examples, the debris can be removed from the NSS output image based on the size of connected components included in the NSS output image. For example, the contours of the connected components in the NSS output image can be analyzed to calculate their sizes. If the size of a connected component is less than a size threshold, the connected component is removed from the NSS output image as debris. In other words, removing the debris includes removing connected components whose sizes are less than a size threshold.

An anomaly image is output (512). For example, and as described herein, the anomaly image is an output image that is absent any non-significant anomalies and debris. Any anomalies included in the anomaly image are actual defects of the object. A detection result of defect anomaly is determined and an alert is selectively sent (514). If the anomaly image includes anomalies after the non-significant anomalies and debris being removed, the anomalies can be determined as defect anomalies (actual defects) of the object. An alert can be selectively sent based on the detection result. The alert can indicate that the object is defective. In some examples, the anomaly detection system can display/provide the alert in a user interface. The user interface can include various output interfaces, such as a speaker or a screen.

Implementations of the present disclosure achieve one or more technical improvements. For example, by suppressing non-significant anomalies and other debris/noises that do not count as defects from detected anomalies, the anomaly detection system of the present disclosure can reduce false positives, increase defective anomaly detection accuracy, and thus improve product quality control. Furthermore, the ML learning model of the present disclosure is trained using a set of images that are absent defect anomalies. The set of images is of a limited size (e.g., including 200-300 non-defective image samples). The dataset for model training of the present disclosure is significant reduced comparing to typical defect detection algorithms that need thousands of defect samples for each defect type. Implementations of the present disclosure can improve resource usage efficiency and data processing efficiency. Implementations of the present disclosure can provide quality inspection at a relatively fast speed (e.g., faster than human).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for detecting anomalies of objects using machine learning (ML) models, the method comprising:

receiving an image of an object;

obtaining a reconstructed image by processing the image through a ML model;

obtaining a gradient difference image by comparing the image to the reconstructed image, wherein the gradient difference image comprises a mix of true positives (or true defects) and false positives (or noise or a non-significant anomaly that does not count as a defect);

generating a non-significant suppression (NSS) map based on selecting a set difference components that satisfy a difference threshold, the difference threshold is determined based on a set of defect images, each defect image representing a sample of the object including one or more defects; wherein the NSS map is generated by obtaining a set of reconstructed images by processing a set of images using the ML model; and comparing each image in the set of images with a respective reconstructed image in the set of reconstructed images to obtain a difference map including the set of difference components;

generating an output image at least partially by suppressing non-significant regions representing non-significant anomalies from the gradient difference image using athe non-significant suppression (NSS) map;

determining whether an anomaly is depicted in the output image; and in response to determining that an anomaly is depicted in the output image, sending an alert indicating that the object is defective.

2. The method of claim 1, wherein the NSS map is initially generated using a set of images, each image in the set of images being absent any defect anomaly.

3. The method of claim 1, wherein the image depicts a side of the object and the ML model and the NSS map are each specific to the side.

4. The method of claim 1, further comprising:

extracting a region of interest (ROI) for the image included in the one or more images; and adjusting the image based on the ROI prior to obtaining the reconstructed image.

5. The method of claim 4, wherein the ROI is extracted based on a predefined range in a hue saturation value (HSV) color-space of the image.

6. The method of claim 1, wherein the output image is further generated by removing representation of debris from the output image, removing the representation of debris comprising removing any connected component having a size that is less than a size threshold.

7. The method of claim 1, wherein the ML model comprises a convolutional neural network (CNN)-based auto-encoder.

8. A system, comprising:

one or more processors; and a computer-readable storage device coupled to the one or more processors and having instructions stored thereon which, when executed by the one or more processors, cause the one or more processors to perform operations for detecting anomalies of objects using machine learning (ML) models, the operations comprising:

receiving an image of an object;

obtaining a reconstructed image by processing the image through a ML model;

obtaining a gradient difference image by comparing the image to the reconstructed image, wherein the gradient difference image comprises a mix of true positives (or true defects) and false positives (or noise or a non-significant anomaly that does not count as a defect);

generating a non-significant suppression (NSS) map based on selecting a set difference components that satisfy a difference threshold, the difference threshold is determined based on a set of defect images, each defect image representing a sample of the object including one or more defects; wherein the NSS map is generated by obtaining a set of reconstructed images by processing a set of images using the ML model; and comparing each image in the set of images with a respective reconstructed image in the set of reconstructed images to obtain a difference map including the set of difference components;

generating an output image at least partially by suppressing non-significant regions representing non-significant anomalies from the gradient difference image using a non-significant suppression (NSS) map;

determining whether an anomaly is depicted in the output image; and in response to determining that an anomaly is depicted in the output image, sending an alert indicating that the object is defective.

9. The system of claim 8, wherein the NSS map is initially generated using a set of images, each image in the set of images being absent any defect anomaly, and wherein the image depicts a side of the object and the ML model and the NSS map are each specific to the side.

10. The system of claim 8, wherein the operations further comprise:

extracting a region of interest (ROI) for the image included in the one or more images; and adjusting the image based on the ROI prior to obtaining the reconstructed image, wherein the ROI is extracted based on a predefined range in a hue saturation value (HSV) color-space of the image.

11. The system of claim 8, wherein the output image is further generated by removing representation of debris from the output image, removing the representation of debris comprising removing any connected component having a size that is less than a size threshold.

12. A non-transitory computer-readable storage media coupled to the one or more processors and having instructions stored thereon which, when executed by the one or more processors, cause the one or more processors to perform operations for detecting anomalies of objects using machine learning (ML) models, the operations comprising:

receiving an image of an object;

obtaining a reconstructed image by processing the image through a ML model;

obtaining a gradient difference image by comparing the image to the reconstructed image, wherein the gradient difference image comprises a mix of true positives (or true defects) and false positives (or noise or a non-significant anomaly that does not count as a defect);

generating a non-significant suppression (NSS) map based on selecting a set difference components that satisfy a difference threshold, the difference threshold is determined based on a set of defect images, each defect image representing a sample of the object including one or more defects; wherein the NSS map is generated by obtaining a set of reconstructed images by processing a set of images using the ML model; and comparing each image in the set of images with a respective reconstructed image in the set of reconstructed images to obtain a difference map including the set of difference components;

generating an output image at least partially by suppressing non-significant regions representing non-significant anomalies from the gradient difference image using a non-significant suppression (NSS) map;

determining whether an anomaly is depicted in the output image; and in response to determining that an anomaly is depicted in the output image, sending an alert indicating that the object is defective.

13. The non-transitory computer-readable storage media of claim 12, wherein the NSS map is initially generated using a set of images, each image in the set of images being absent any defect anomaly, and wherein the image depicts a side of the object and the ML model and the NSS map are each specific to the side.

14. The non-transitory computer-readable storage media of claim 12, wherein the operations further comprise:

extracting a region of interest (ROI) for the image
 included in the one or more images; and adjusting the image based on the ROI prior to obtaining
 the reconstructed image, wherein the ROI is extracted
 based on a predefined range in a hue saturation value
 (HSV) color-space of the image.

5

\* \* \* \* \*